United States Patent [19]

Gassmann

[11] Patent Number: 5,258,679

[45] Date of Patent: Nov. 2, 1993

[54] STRUCTURE OF DC MOTOR WITH ELECTRONIC COMMUTATION

[75] Inventor: Jean-Marie Gassmann, Beaucourt, France

[73] Assignee: ECIA, France

[21] Appl. No.: 908,417

[22] Filed: Jul. 6, 1992

[30] Foreign Application Priority Data

Jul. 4, 1991 [FR] France ................. 91 08406

[51] Int. Cl.$^5$ .................. H02K 11/00; H02K 1/00
[52] U.S. Cl. .................................. 310/194
[58] Field of Search .............. 310/71, 42, 194, 214, 310/233, 234, DIG. 6, 270

[56] References Cited

U.S. PATENT DOCUMENTS 3,339,097  8/1967  Dunn ..................... 310/194
4,558,245 12/1985  Glasauer et al. ......... 310/194 X

FOREIGN PATENT DOCUMENTS 3331754  3/1984  Fed. Rep. of Germany .
3442348  5/1986  Fed. Rep. of Germany .
8624505  8/1987  Fed. Rep. of Germany .
2651933  3/1991  France .

OTHER PUBLICATIONS

Copies of French Search Report, Mar. 1992 (2 pages).

Primary Examiner—Steven L. Stephan
Assistant Examiner—E. To
Attorney, Agent, or Firm—Sughrue, Mion, Zinn, Macpeak & Seas

[57] ABSTRACT

A DC motor having an electronic commutator including, inter alia, an annular insulating support (410) which carries at its periphery (4101) a ring (4102) which is bordered on one side by a lateral rim (4103) having a lesser diameter. The ring (4102) is arranged to define teeth (4104) having a rectangular cross-sectional shape (4106) and defining therebetween gaps (4108) which are each provided in their middle with a mushroom-shaped element (4000). Each mushroom-shaped element has a foot (4001), which is higher than the depth of the gap (4108), and a head (4002) which overhangs both the teeth (4104) which surround it and the rim (4103). The rim (4103) is provided with slits (4003) located in alignment with the feet (4001).

7 Claims, 3 Drawing Sheets

STRUCTURE OF DC MOTOR WITH ELECTRONIC COMMUTATION

BACKGROUND OF THE INVENTION

The present invention relates to electric motors which have an electronic commutation and more particularly relates to the structure thereof.

As is known, motors having an electronic commutation comprise, among other elements, a housing which contains a wound armature from which a shaft extends. The commutation means of this armature, instead of being formed by an electromechanical device consisting of a ring and brushes, are in this case formed by an electronic device having a control module.

This type of motors usually presents a delicate problem of manufacture, construction and assembly. Indeed, windings must be formed and disposed in slots of the armature, then the ends of the wires of the winding coils of this armature must be connected to the electronic circuit of the control module and, lastly, it must be possible to dissipate the heat of the power components of the electronic circuit of the control module.

One difficulty relates to the forming of the windings of the armature when it is desired to proceed automatically and the slots of the armature do not permit prefabricating these windings in such a way as to merely place them in the slots. In such a case, in particular if it is desired to proceed mechanically or automatically, there must be used a winding machine provided with an articulated arm which rotates about an axis and is supplied with wire from a reel taking the wire from a reserve supply. This arm describes a relatively complex path in order to form the wire, as it is unwound, into loops which are placed in succession in the slots. To operate in this way, it is therefore necessary to so arrange the armature that it is relatively free from obstructions and provides ease of access in order to avoid hindering the travel of the rotating articulated arm, in particular by the presence of contactors which will receive the ends of the wires or conductors of each coil.

One difficulty is presented by the connection of the ends of the wires of the coils with the electronic circuit of the control module, which is usually achieved by soldering the wire ends to terminal connectors associated with the electronic circuit. Most of the time, bearing in mind the configuration of the structure of the motor, such a soldering can only be carried out manually. In relatively conventional motors having a star connection, many solderings must be carried out since the winding coils of the armature are multiple and each coil requires two solders. Such an operation, which is particularly difficult to automate, therefore requires very great skill and is time-consuming. It must be remembered that, for this operation, the ends of the wires are then without any material support and are as it were "in the open" or "in the air", which renders this operation particularly delicate, especially as it must be carried out in a very limited space difficult of access. Further, whatever the dexterity of the operator, the solders are subject to faulty contacts. For example, these solders may be "dry", i.e. the scavenging solution of the soldering flux in fact insulates the wire from the terminal connector instead of ensuring electrical continuity.

In order to overcome another difficulty, there is often employed for the electronic device an insulating substrate which carries a conductive printed circuit on which the components of the electronic circuit of the control module are placed, fixed and connected. After having been thus equipped, this substrate is usually placed in proximity to one of the end walls or bells of the housing of the motor and preferably in the vicinity of the inner side thereof. However, as this circuit comprises power components which must be cooled so as to avoid the heating thereof which would otherwise have a destructive effect, an arrangement is adopted in which the insulating substrate is provided with throughway orifices, and the power components are directly fixed to the end wall of the motor, through these orifices; in this way this end wall, owing to its mass and its metallic nature, acts as a radiator evacuating the heat produced in the power components in operation of the motor. The fact of having to divide the electronic circuit, in such manner that some of its components are no longer on the substrate itself but mounted directly on an end wall, requires additional operations for placing in position, fixing and then electrically connecting, by soldering, these components to the printed circuit of the substrate; it will be easily understood that this also complicates the mounting and assembly operations and may also result in defective workmanship.

A technique for overcoming some of the previously-mentioned difficulties is for example disclosed in the document FR 89-11 771 filed on Sep. 8, 1989 in the name of the applicant. However, the technique disclosed does not permit carrying out a winding, a connection and then an assembly which are automatic.

SUMMARY OF THE INVENTION

An object of the invention is to avoid practically all of these difficulties by means of a motor having an electronic commutation and an improved structure.

The invention therefore provides a motor with an electronic commutation comprising, among other elements, a housing with a body, end walls adapted to receive at least a bearing, a shaft mounted in the bearing or bearings, a wound armature, commutation means with a connector constituted in particular by an insulating support adapted to be carried by the armature for receiving the ends of the wires of the winding coils of the armature which are to be electrically connected to counter-studs of a printed circuit and with a control module comprising an insulating substrate which carries said printed circuit adapted to receive components including electronic circuit power components and which is preferably directly applied to and maintained in intimate contact with the inner side of an end wall, and in which said insulating support is mounted on said shaft, said insulating support and said shaft are provided with a fool-proof means which allows only one fixed orientation in rotation and which also ensures the relative orientation in rotation of said ends of said wires of the winding coils of the armature and counter-studs while allowing a relative axial sliding of said insulating support and said shaft and in which said relative axial sliding is possible, at least up to the end of the operation for fixing the ends of the wires of the winding coils. Said motor is characterized in that said insulating support is of annular shape and carries on the periphery thereof a ring bordered on one side by a lateral rim of smaller diameter, said ring is arranged to constitute teeth having a rectangular cross-sectional shape and separated by gaps, each gap being provided in the middle of the gap with a mushroom-shaped element having a foot which is higher than the depth of the gap and a head which overhangs both of the teeth which surround it and the rim, and the rim is provided with slits disposed in alignment with the feet.

Further features of the invention will be apparent from the following description and claims with reference to the accompanying drawing which is given solely by way of example and in which:

DESCRIPTION OF A PREFERRED EMBODIMENT

Figure 1:
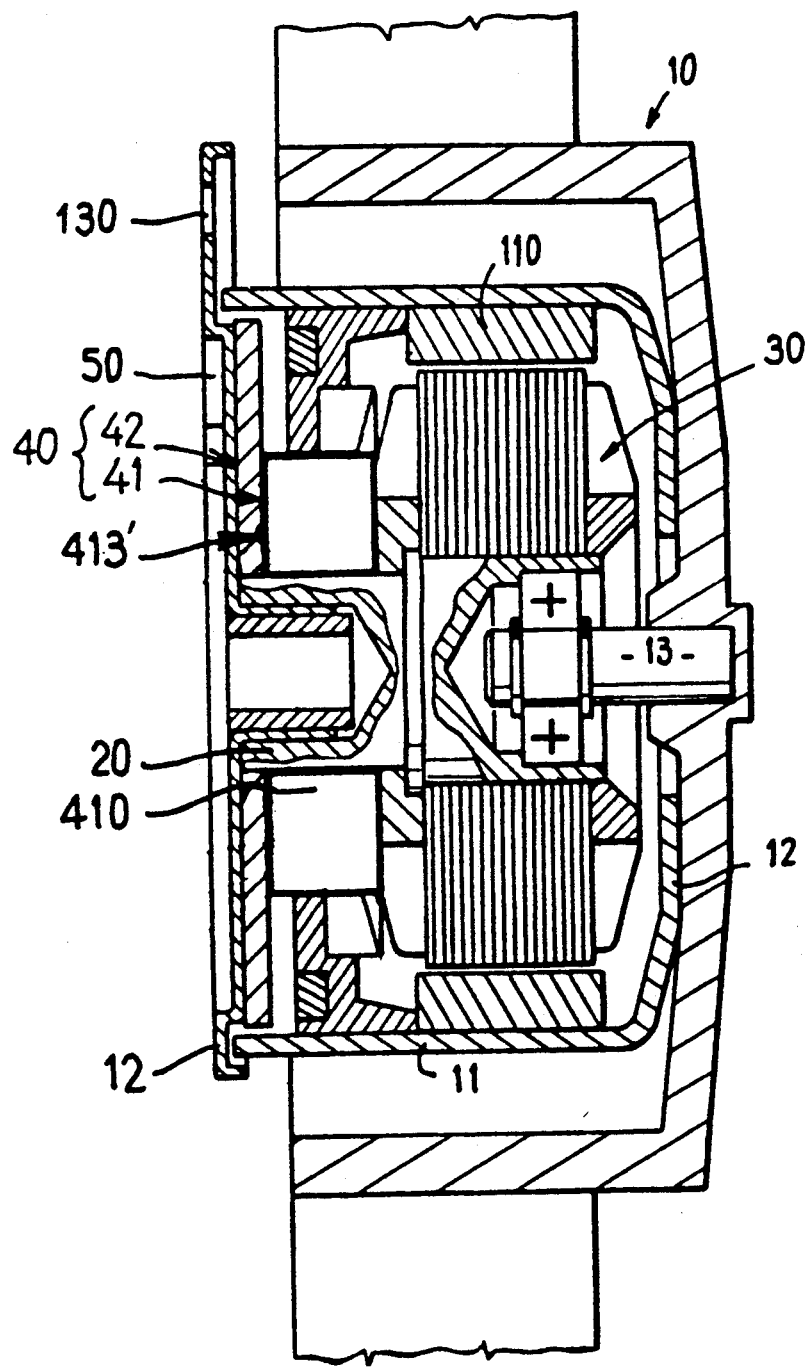
FIG. 1 is a diagrammatic diametrical axial sectional view of a motor according to the invention.

As motors with an electronic commutation are well known in the art, only that which directly or indirectly concerns the invention will be described. For the rest, one skilled in the art will draw from conventional current solutions available for resolving particular problems which may arise.

Hereinafter, the same reference character will always be employed for identifying a similar element whatever the embodiment.

Figure 2:
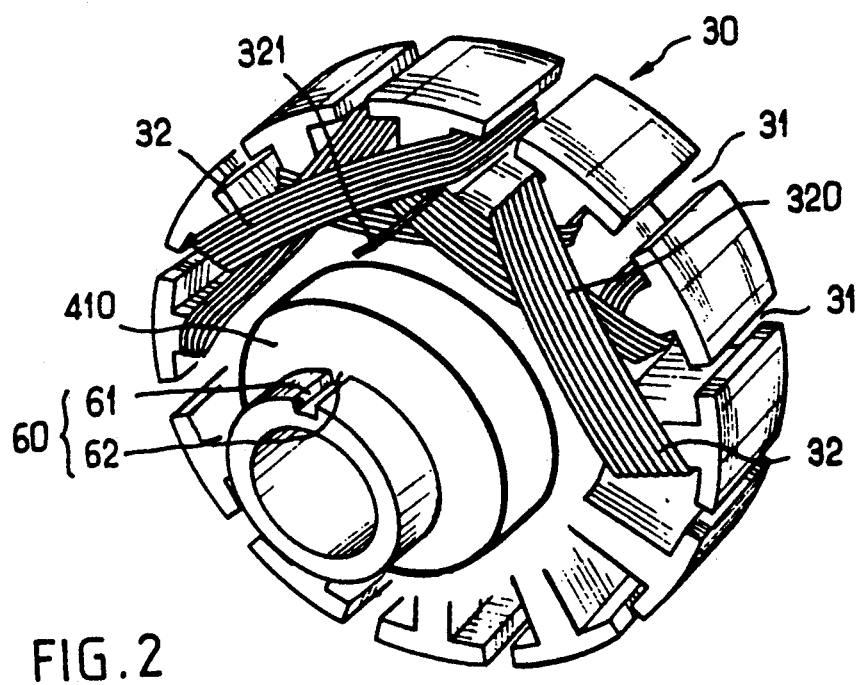
FIG. 2 is a perspective view of the finished armature ready for uniting with the end wall shown in FIG. 3.

As can be seen in the Figures of the drawing, a motor with an electronic commutation according to the invention, comprises, among other elements, a housing 10, a shaft 20, a wound armature 30 associated with the shaft, and commutation means 40. This motor is also provided with terminal means 50 for connecting it to an electric power supply in the conventional manner, and foolproof means 60 (FIG. 2) the function of which will be explained hereinafter.

For convenience of description, each of these component parts of a motor with an electronic commutation according to the invention will be described in succession.

The housing 10 comprises a substantially cylindrical body 11 and relatively planar end walls or bells 12. At least one of these end walls carries a bearing 13, for example a ball bearing, only one of which is shown, as is conventional.

The housing 10 receives the shaft 20 and the wound armature 30. The shaft 20 is carried by the bearing or bearings. The wound armature comprises slots 31 (FIG. 2) in which are disposed winding coils 32 composed of a wire or conductor 320 whose two ends 321 must be connected to terminal connectors or the like. This is relatively conventional. In the illustrated particular embodiment, the shaft and wound armature are fixed whereas a part of the housing is movable in rotation. Owing to this configuration, one of the end walls 12 is not directly connected to the body so as to be capable of rotating with the field means, for example permanent magnets 110, which it carries. The other end wall carries the commutation means, the armature and the shaft and remains stationary, it being fixed for example by means of bolts (not shown) engaged in apertures 130.

The commutation means 40 are carried by one of the end walls 12, here the fixed end wall, to which the terminal means 50 is also fixed.

As can be seen, the commutation means 40 comprise a connector 41 and a control module 42.

The connector 41 comprises an insulating support 410 on which are placed the ends 321 of the wires 320 of the winding coils 32 of the armature to be electrically connected to the counter-studs 413' of a printed circuit thereby providing electrical continuity, as will be understood hereinafter. This connector constitutes as it were a multi-pin plug.

Figure 3:
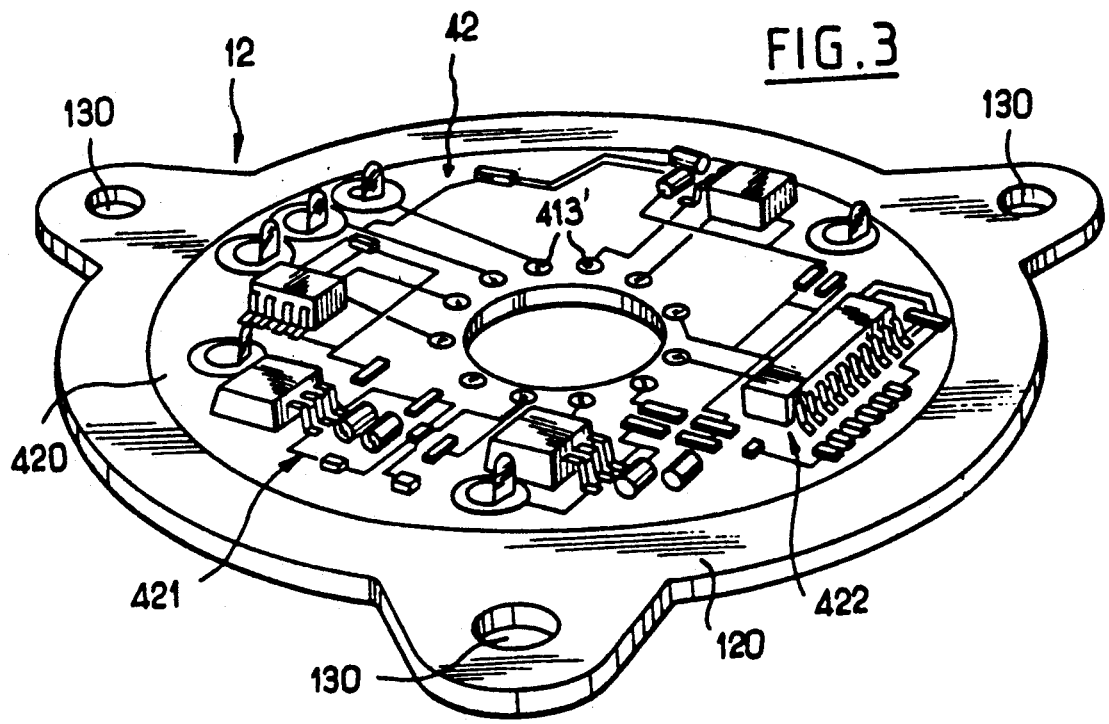
FIG. 3 is a diagrammatic partial perspective view of an end wall equipped with its control module.

The control module 42 comprises an insulating substrate 420 (FIG. 3) which carries the design of a conductive printed circuit 421 adapted to receive components including the power components of an electronic circuit 422. As can be seen, the substrate 420 is applied directly against the inner side 120 of an end wall 12 and is maintained in intimate contact with the latter so that the printed circuit and the components are apparent. The insulating substrate is for example a thin sheet of polyamide resin one of the sides of which is coated with a layer of copper from which is made to appear by photoengraving the conductive network of the printed circuit including, as the case may be, the counter-studs 413' (FIG. 1), the other side of the substrate being adhered to the inner side of the end wall.

When the windings 32 are formed with the aid of a mechanical winding machine, which is for example robotized, the arm of the machine which is articulated and rotates about an axis, must be able to follow at least two successive slots so as to place therein the wire coils 320. To form the windings, the arm therefore must not be hindered in its travel, in particular by the insulating support 410 which will receive the ends 321 of the wire 320 which will be soldered, brazed or hot inserted, or electrically connected in any other current conventional manner to the commutation means.

In order to remove any obstacle, at least temporarily, in the armature 30 and facilitate an automatic formation of the winding coils 32, a connector 41 is employed which comprises an annular insulating support 410 which is slipped over the shaft 20 so as to be slidable thereon without being allowed to rotate with respect to the shaft. For this purpose, a fool-proof means 60 (FIG. 2) is employed which allows and fixes only a single relative orientation in rotation while permitting a relative axial sliding of the insulating support 410 and the shaft 20. This fool-proof means therefore ensures a biunivocal location of the ends of the wires of the particular winding coils which will subsequently permit the correct corresponding positioning with the counter-studs 413'. This fool-proof means 60 comprises male elements 62 and complementary female elements 61, for example of the tongue-and-groove type. In the illustrated embodiment, the groove is provided on the shaft 20, for example in the form of an axially extending peripheral recess, and the tongue is carried by the annular insulating support 410, for example in the form of a radially extending projection on the inner periphery of the support 410, this projection having a cross-sectional shape complementary to that of said recess.

It will be understood that this configuration of the fool-proof means is not the only one which may be used. This fool-proof means may employ the number of pairs of poles of the motor, their possible symmetries so as to make use thereof and not, for example, employ a uniform distribution of the counter-studs or an even distribution of male and female counter-studs.

Figure 5:
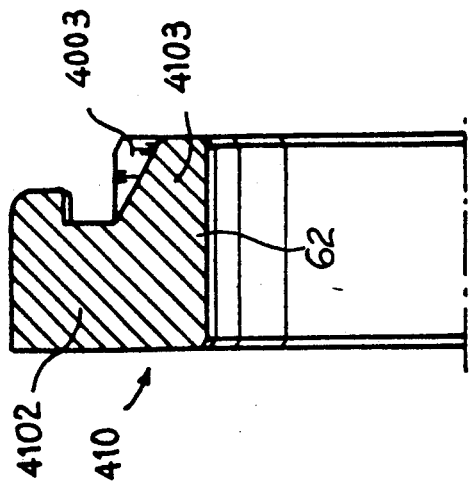
FIG. 5 is a partial sectional view, taken on line V—V of FIG. 4, of a detail of the insulating support of said connector.
Figure 4:
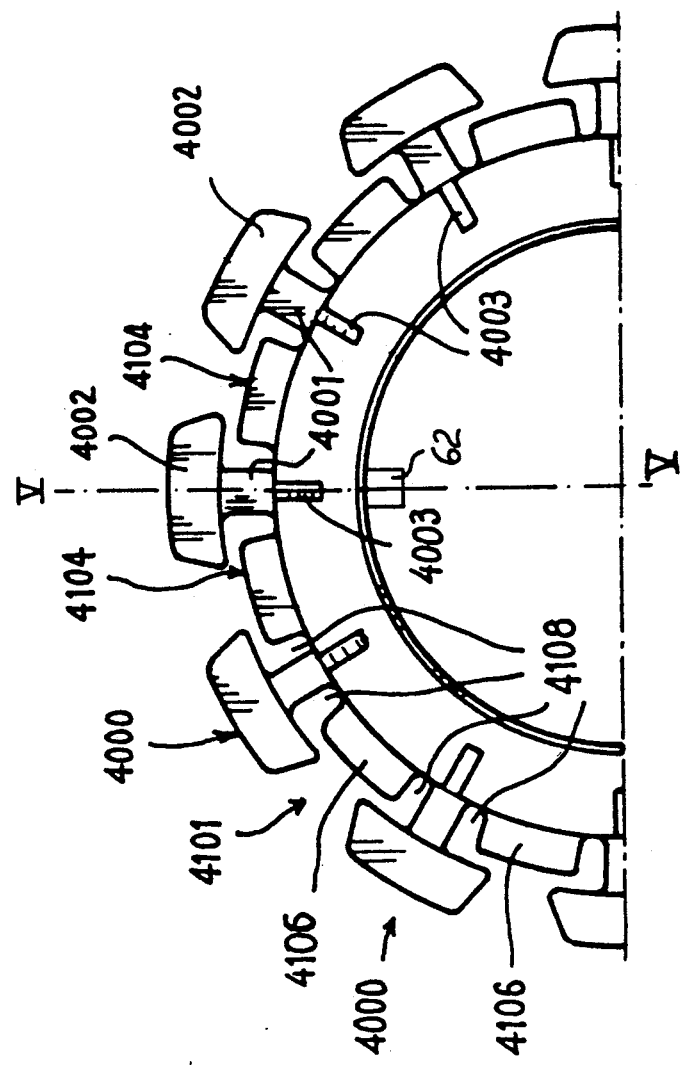
FIG. 4 is a partial detail view of an insulating support of a connector according to the invention.

As can be seen in the FIGS. 4 and 5 of the drawing, the insulating support 410 has a ring configuration or annular shape. The insulating support 410 carries at its outer periphery 4101 a ring 4102 which is bordered on one side by a lateral rim 4103. The diameter of the rim 4103 is less than that of the ring 4102. The ring 4102 is arranged to define teeth 4104 having a rectangular cross-sectional shape 4106. Each gap 4108 between the teeth is provided in the middle thereof with a mushroom-shaped element 4000. As can be seen, the element 4000 has a foot 4001 which is higher than the depth of the gap 4108 and a head 4002 which overhangs both the teeth 4104 which surround it and the rim 4103. The head 4002 preferably has a configuration whose cross-sectional shape is a curved isosceles trapezium. The rim 4103 is provided with slits 4003 located in alignment with the feet 4001. The depth of the slits 4003 increases in the direction away from the foot. These slots have a preferably rectilinear inner end which is inclined at about 30° to the axis of the insulating support (see FIG. 5).

These mushroom-shaped elements permit an easy winding of the wire, since the configuration of their head allows a correct presentation of the wire during the winding operation and the maintenance of the wire, and the flexibility of the foot allows the insertion of the wire in the gap between tooth and foot; the width, depth and geometry of the slits in particular are adapted to the wire to be received therein. The same is true of the size of the overhanging part of the head relative to the subjacent part of the tooth, which is adapted to the wire to be received.

The teeth and the mushroom-shaped elements are, or are not, evenly spaced apart; however, they are preferably spaced equal distances apart.

The insulating support is for example made by the moulding of a synthetic material.

The whole interest of the solution provided by the invention will be understood, since the connector alone ensures the connection between the winding coils of the armature and the commutation means.

It will therefore be understood that the connector according to the invention performs the function of an interface between the attachment points of the ends of the wires of the winding coils when winding and the electronic circuit, while it guarantees an electric connection and an angular location of the inputs and outputs of the coils with respect to the electronic circuit, as a result of the existence of the fool-proof means which allows an at least temporary axial displacement of the insulating support to permit the movements of the arm of a winding machine.

Owing to the invention, it is possible to industrially and automatically manufacture an electric motor with an electronic commutation. Owing to the existence of the fool-proof means, it is also possible to ensure the correct coincidence of the laminations or plates of the armature to favour their correct, well-oriented stacking. The insulating support 410 is placed in position and maintained initially at a distance from the stack of laminations or plates when forming the windings. When the latter have been finished, the wire ends of each winding coil are electrically connected, if need be, by soldering for example with a tin flux, by electrically welding or in any other way. Then the insulating support 410 is urged against the laminations of the armature so as to reduce the overall size of the assembly. This reduction in the overall axial size is much appreciated, since in general the sought-after increase in the powers of the motors implies the use of wires of larger diameter which are of course more difficult to form. The solution provided by the invention permits the use of a shaft whose projecting part has a length which does not exceed about one-half of its outside diameter, whereas in conventional motors this length usually exceeds about one and one-half of this diameter. It is then sufficient to move the coiled armature toward the control module provided with its counter-studs, again with the use of the fool-proof means. It will therefore be understood that this last operation may be carried out automatically by means of a robot or a programmable automated device.

The whole interest of the motor with an electronic commutation according to the invention is therefore clear, since it permits a greatly automated industrial manufacture of the motor.

An electric motor having an electronic commutation and an improved structure according to the invention is particularly suitable for fans of the type employed for example in motor vehicles. In such a case, the housing with its body are formed by a "bowl" associated with the blades of the fan which caps the rotor of the motor. The blades are fitted on the shaft which serves to hold together the assembly.

What is claimed is:

1. Motor with an electronic commutation, said motor comprising a housing having a body, end walls carrying at least one bearing, a shaft mounted on said at least one bearing, a wound armature having wires forming winding coils and carried by said shaft, commutation means comprising a connector having an annular insulating support coaxially mounted on said shaft, and a control module having an insulating substrate, a printed circuit including counter-studs and components including electronic circuit power components carried by said substrate, said counter-studs being connected to ends of said wires of said winding coils, fool-proof means interposed between said insulating support and said shaft for allowing only one fixed angular orientation of said insulating support relative to said shaft and also ensuring a relative angular orientation in rotation of said ends of said wires and said counter-studs while allowing a relative axial sliding of said insulating support and said shaft, said relative axial sliding being possible at least up to the end of an operation for connecting said ends of said wires of said winding coils to said counter-studs, said insulating support carrying on an outer periphery thereof a ring which is bordered on one side by a lateral rim having a diameter smaller than the diameter of said ring, said ring being so arranged as to constitute teeth which have a rectangular cross-sectional shape with gaps separating said teeth, there being provided in the middle of each of said gaps a mushroom-shaped element having a foot which is higher than the depth of said gap and a head which overhangs both of the immediately adjacent teeth of said teeth and said rim, slits being provided in said rim in alignment with said feet.

2. Motor according to claim 1, wherein said substrate is directly applied to and maintained in intimate contact with an inner side of one of said end walls.

3. Motor according to claim 1, wherein said head has a cross-sectional shape which is a curvilinear isosceles trapezium.

4. Motor according to claim 1, wherein said mushroom-shaped element is flush with a side of said insulating support which is remote from said rim.

5. Motor according to claim 1, wherein each slit has a depth which increases in a direction away from the respective foot.

6. Motor according to claim 5, wherein each of said slits has a rectilinear inner end inclined at substantially 30° with respect to an axis-of-revolution of said annular insulating support.

7. Motor according to claim 1, wherein the size of the overhanging part of said head relative to a subjacent tooth part is adapted to the section of the winding coil wire to be received.

* * * * *